(No Model.)
F. BLAKE.
SPEAKING TELEPHONE.
No. 250,129. Patented Nov. 29, 1881.
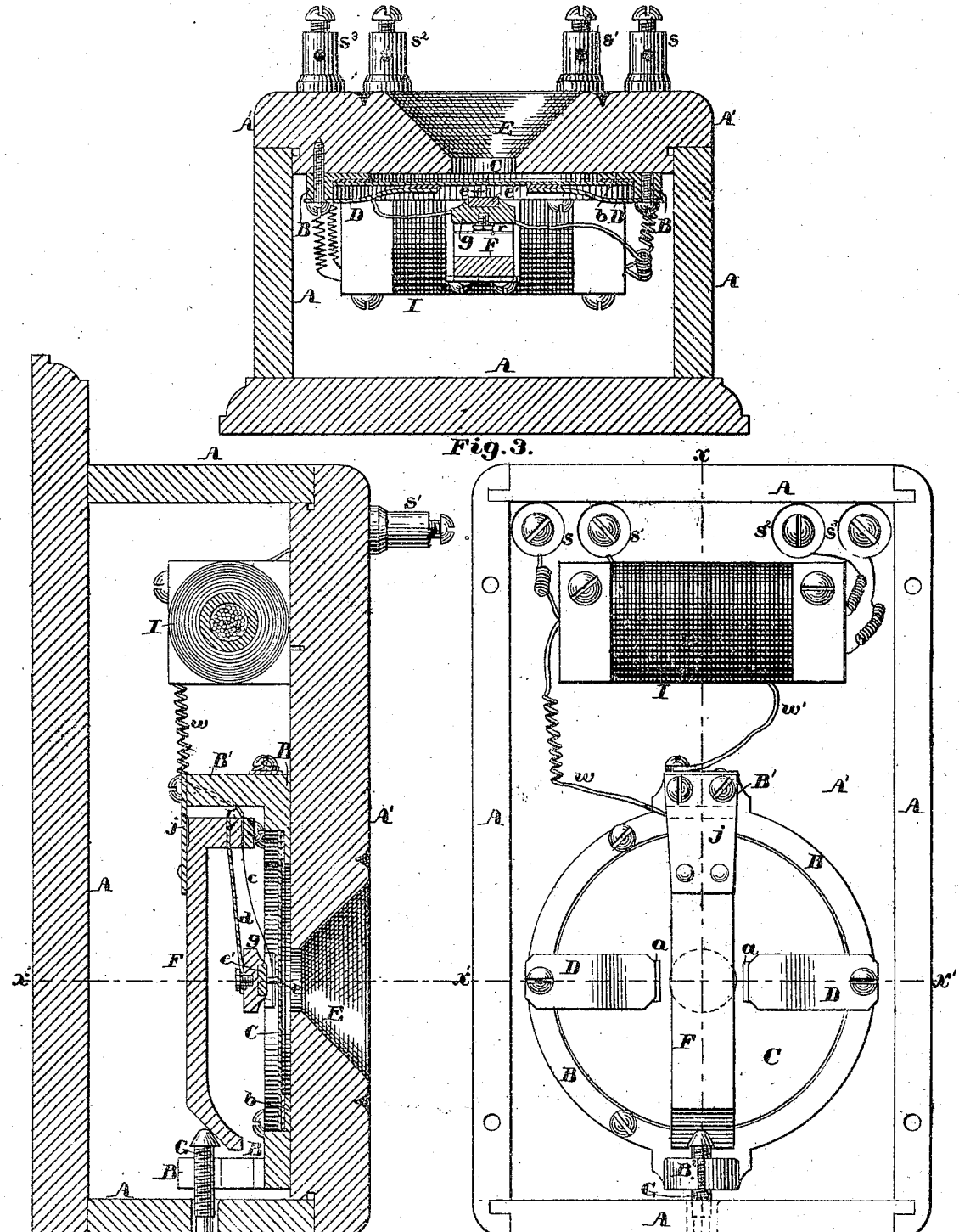
Witnesses:
H. G. Swan
Franz Sobotka
Inventor:
Francis Blake
by W. W. Swan
Attorney.

UNITED STATES PATENT OFFICE.

FRANCIS BLAKE, OF WESTON, MASSACHUSETTS.

SPEAKING-TELEPHONE.

SPECIFICATION forming part of Letters Patent No. 250,129, dated November 29, 1881.

Application filed October 31, 1881. (No model.) Patented in England January 20, 1879, in Canada May 28, 1879, in Italy May 20, 1880, in New South Wales July 20, 1880, in Cape of Good Hope August 30, 1880, in Natal September 6, 1880, in Spain November 5, 1880, in Portugal November 10, 1880, and in British Guiana March 23, 1881.

*To all whom it may concern:*

Be it known that I, FRANCIS BLAKE, of Weston, in the State of Massachusetts, have invented certain new and useful Improvements in Speaking-Telephones, of which the following is a specification.

My said improvements relate to that form of transmitting-telephone in which the undulations or variations in the strength of an electric current necessary for reproducing sounds in a receiving-instrument are produced by varying the resistance of the circuit through changes of pressure between two electrodes of the circuit.

As heretofore constructed, one of the electrodes in such instruments is held in fixed position, while the other, being free to move to some extent, is constantly held in contact with such fixed electrode, and is pressed against it with greater or less force by the vibrations of the diaphragm with which it is connected. In using an instrument of this form it has been found necessary to adjust the initial static pressure between its electrodes with great care and delicacy, in order to secure such a variation of resistance between them under the vibrations of the diaphragm as will enable the current to reproduce in a receiving-instrument the sounds which fall upon the transmitting-instrument. When such an adjustment has been secured it is easily disturbed by slight causes, such as a change in the temperature of the instrument or a trifling movement of some of its parts in relation to other parts.

By my invention the proper adjustment is easily secured and is not liable to be disturbed in the practical use of the instruments. I support both electrodes in such a manner that they can move freely with the diaphragm. One of them may be attached directly to and be supported by the diaphragm; but I prefer to support it in contact with the diaphragm, but by an independent support. The other electrode is supported so as to move freely, but is made so heavy, or is so weighted, that by its inertia it will offer a resistance to the slight and quick vibrations of the diaphragm which will give a varying pressure between the electrodes and a consequent change in the resistance of the circuit. This second electrode is so supported that the initial static pressure between the two will not be sensibly affected by a change of temperature within the ordinary range of temperatures to which such instruments are exposed. It is on the end of a spring, the other end of which is connected to a lever, by means of which the proper initial pressure between the electrodes and against the diaphragm is obtained.

The manner in which I construct instruments embracing my invention is shown in the drawings hereto annexed, in which—

A represents a box or casing, in which the mechanism of a telephone embracing my improvements is inclosed. This mechanism is, for convenience, attached to the cover or top of the box A'.

Figure 1 is a plan of the mechanism attached to the top or cover of the box. Fig. 2 is a section of the box and mechanism, taken through the middle, on the dotted line $xx$ of Fig. 1, and showing one of the screw-cups for making connections with the exterior circuits. Fig. 3 is a cross-section of the box and mechanism on the dotted line $x'x'$ of Figs. 1 and 2, and showing the screw-cups for making connections with the exterior circuits.

B represents a metal ring or frame for holding the mechanism of the telephone. It is screwed to the cover A', as shown, and has two ears, B' B². On the inner surface of the ring B is a narrow ledge or lip, $b$, on which the disk or diaphragm C is placed. This diaphragm is formed, as usual, of a thin iron plate. A lining of paper or other suitable material is placed between it and the ledge or lip, and it is held in place by two springs, D D, attached to the metal rim or ring B, with their free ends pressing upon the back of the diaphragm, near its center, so as to hold it against the ledge. Thin pads of rubber $a$ $a$ are placed between the ends of the springs and the diaphragm. By this method of holding the diaphragm in place it is less liable to be distorted by a change of temperature than when held wholly at its circumference.

The center of the ring and diaphragm is placed opposite the orifice E in the cover A', through which the sounds enter the instrument. On the other side of the diaphragm, and at its center, is placed one of the electrodes. It is a small metal bar, $e$, one end of which rests against the diaphragm. The other end is brought nearly to a point, and is in contact with the other electrode, $e'$. It is desirable that it should be formed of or plated with some metal, like platinum or nickel, which is not easily corroded. It may be attached directly to the diaphragm; but I prefer to support it independently, as shown, upon a light spring, $c$, which tends to press it away from the diaphragm and toward the opposite electrode. This method of supporting the electrode insures its contact with the other electrode under some circumstances, when otherwise they would be liable to be separated and the circuit broken. The other electrode, $e'$, is formed on a weighted spring, $d$, which is supported on an adjusting-lever, F, by which the tension of the spring is regulated. This spring must be stronger than the spring $c$, which supports the electrode $e$, and from its greater strength it tends to keep the electrode $e$ in contact with the diaphragm. It is made of a piece of a common watch-spring, and it carries at its free end a weight, $g$, heavy enough to check very greatly the rate of vibration of the spring. This weight may be of metal, which may serve directly as the electrode; but I have obtained better results by applying to it, at the point of contact with the other electrode, a piece of gas-coke or a hard-pressed block of carbon, such as is used for electric lights. The employment of the coke or carbon does not, however, constitute a part of any of my inventions further than it contributes a portion of the weight carried by the spring. If the weight is a non-conductor, as it may be, there must be a metallic conductor between the carbon or other electrode used and the spring or some other part of the circuit. The weight must be proportioned to the stiffness of the spring, a stiff spring requiring a heavier weight than a weaker one.

The adjusting-lever F, to an arm of which one end of the spring $d$ is attached, is a stiff bar connected at one end by a stiff spring, $j$, to the ear B′ of the ring B. The other end rests upon an adjusting-screw, G, placed in the ear B² on the opposite side of the ring. The spring $j$ tends to force the lever F away from the diaphragm and against the adjusting-screw G. The ear B², supporting the adjusting-screw G, is drilled and slotted, as shown in Figs. 1 and 2, to prevent the screw from wearing loose. The part of the lever F which comes in contact with the screw is inclined to the axis of the screw, as shown, so that when the screw is forced inward it will press the lever toward the diaphragm, and when it is withdrawn the lever will, by the tension of the spring $j$, be forced away from the diaphragm. The outer end of the screw extends into a hole, $l$, through the casing, and is fitted to receive a key, by which it can be turned to adjust the lever to a desired position.

The pressure between the two electrodes and against the diaphragm obviously depends upon the position given to the adjusting-lever by the adjusting-screw G; but it is obvious that as this pressure can be increased or diminished only by increasing or diminishing the tension of the spring $d$, the changes in the pressure by turning the screw will be much less rapid than they would be if the electrode were acted upon directly by the lever or the adjusting-screw. Hence a proper adjustment of the initial static pressure between the electrodes can be much more easily obtained through the agency of the spring $d$ than without it. It will also be easily seen that this pressure will not be sensibly affected by any slight change in the position of the electrodes which might arise from the expansion or contraction of any part of the apparatus under a change of temperature. On the other hand, it will be seen that if the diaphragm is thrown into the rapid but slight vibrations caused by sounds, the spring alone would yield to them so readily as to give but little change of pressure between the electrodes within the range of the vibrations; but by reason of the inertia of the weight the tendency of the spring to follow the vibrations of the diaphragm will be checked, and a greater range of pressures between the electrodes will be obtained. At the same time it is easy to see that the changes of pressure will be very different from what they would be if the electrode were supported rigidly and could not yield to the movements of the diaphragm.

For convenience in construction, when employing the independent spring $c$ for the purpose above stated, I attach it to the same arm of the adjusting-lever F to which the spring $d$ is attached, and separate the two springs by a piece of insulating substance, $r$; but the spring $c$ might be attached to any convenient portion of the instrument, if properly insulated.

The wires for connecting this transmitting-instrument with the receiving-telephone are marked $w$ and $w'$. I have, however, shown them as connected with the primary circuit of an induction-coil, I, in connection with which $s$ and $s'$ are the screw-cups leading to the battery, while $s^2$ $s^3$ are screw-cups for connecting the line-wires with the secondary circuit of the coil I.

The use of the induction-coil is not essential, and the wires $w$ $w'$ may go at once to the receiving-instrument. The wire $w$ is connected directly with the spring-arm $c$ of the electrode $e$, as shown in Fig. 2. The wire $w'$ is connected with one of the ears of the ring B, as shown in Fig. 3, which is in metallic connection with the electrode $e'$, as shown in Fig. 2.

In applications already pending for patents for improvements in speaking-telephones, the first of which was filed January 3, 1879, I have described and shown precisely the same instrument herein described and shown. The object of the present application is to secure, by a division of the said application of January 3, 1879, a separate patent for the combination hereinafter claimed. All other inventions made by me and embodied in the said instrument are herein disclaimed, since they form or will form the subject-matter of claims in the said other applications or in still further applications filed herewith or to be filed hereafter.

I here claim—

In a speaking-telephone, the combination, substantially as described, with a vibrating diaphragm, an inner electrode supported as described, so as to be normally in direct contact with said diaphragm, of an outer electrode, weight, and spring, the said spring carrying the weight and outer electrode and pressing them against the inner electrode and toward the diaphragm, and the said weight being sufficiently heavy to aid in maintaining a constant contact between the electrodes, whether the diaphragm be at rest or in motion, and likewise to resist the movement of the diaphragm and modify by its inertia the variation in pressure between the electrodes.

FRANCIS BLAKE.

Witnesses:
P. C. BAKER,
W. P. MONTAGUE.